US008514785B2

(12) United States Patent
Anekoji et al.

(10) Patent No.: US 8,514,785 B2
(45) Date of Patent: Aug. 20, 2013

(54) COMMON RF INTERFACE FOR SEPARATING AND MIXING WIRELESS SIGNALS

(75) Inventors: Fumio Anekoji, Ninomiya (JP); Pubudu Sampath Wijesena, Inagi (JP)

(73) Assignee: Freescale Semiconductor, Inc., Austin, TX (US)

( * ) Notice: Subject to any disclaimer, the term of this patent is extended or adjusted under 35 U.S.C. 154(b) by 270 days.

(21) Appl. No.: 13/079,030

(22) Filed: Apr. 4, 2011

(65) Prior Publication Data

US 2012/0250614 A1 Oct. 4, 2012

(51) Int. Cl.
*H04W 88/06* (2009.01)

(52) U.S. Cl.
USPC .......................... 370/328; 375/260; 455/552.1

(58) Field of Classification Search
CPC ..................................................... H04W 88/06
USPC ................ 370/260, 328, 210; 455/552.1
See application file for complete search history.

(56) References Cited

U.S. PATENT DOCUMENTS

| 7,453,856 | B2* | 11/2008 | Guey | 370/336 |
| 8,045,936 | B2* | 10/2011 | Wu et al. | 455/91 |
| 2004/0172433 | A1* | 9/2004 | Acharya et al. | 708/300 |
| 2006/0013168 | A1* | 1/2006 | Agrawal et al. | 370/335 |
| 2006/0073797 | A1* | 4/2006 | Kent et al. | 455/132 |
| 2007/0211619 | A1* | 9/2007 | Jalloul et al. | 370/209 |
| 2007/0223604 | A1* | 9/2007 | Miyano et al. | 375/260 |
| 2008/0089223 | A1* | 4/2008 | Wu et al. | 370/209 |
| 2009/0074098 | A1* | 3/2009 | Wu et al. | 375/260 |
| 2009/0135960 | A1* | 5/2009 | Yotsumoto | 375/340 |
| 2009/0172759 | A1 | 7/2009 | Jung | |
| 2009/0245089 | A1* | 10/2009 | Kandukuri Narayan et al. | 370/210 |
| 2010/0098182 | A1* | 4/2010 | Forck et al. | 375/261 |
| 2010/0227639 | A1 | 9/2010 | Kim | |
| 2010/0317357 | A1 | 12/2010 | Miki | |
| 2011/0007793 | A1* | 1/2011 | Cairns et al. | 375/232 |
| 2011/0080974 | A1* | 4/2011 | Seller | 375/295 |
| 2012/0252446 | A1* | 10/2012 | Reial et al. | 455/434 |

* cited by examiner

*Primary Examiner* — Kibrom T Hailu
*Assistant Examiner* — Benjamin Lamont
(74) *Attorney, Agent, or Firm* — Charles Bergere (57) ABSTRACT

When a wireless communication device is receiving, a baseband circuit generates frequency domain LTE and WCDMA signals using a Fourier transform. The frequency domain WCDMA signal is then filtered with an RRC filter and converted back to the time domain using an inverse discrete Fourier transform. During transmission, the baseband circuit uses a Fourier transform to convert a time domain WCDMA signal to a frequency domain WCDMA signal. The frequency domain WCDMA signal is then filtered with an RRC filter and combined with a frequency domain LTE signal using an inverse Fourier Transform.

16 Claims, 7 Drawing Sheets

COMMON RF INTERFACE FOR SEPARATING AND MIXING WIRELESS SIGNALS

BACKGROUND OF THE INVENTION

The present invention relates to a wireless communications device that has a common RF interface that receives WCDMA (Wideband Code Division Multiple Access) signals and LTE (Long Term Evolution) signals, and a baseband circuit that separates and combines WDCMA and LTE signals.

In recent years, use of 3GPP LTE as a high volume and high speed communications system has begun. A LTE system may select an arbitrary channel bandwidth from a frequency bandwidth of 1.4 MHz, 3 MHz, 5 MHz, 10 MHz, 15 MHz, or 20 MHz. There may be cases where the LTE may be a Third Generation (3G) communications systems using adjacent frequency bands and WCDMA. Focusing on cases where WCDMA and LTE use adjacent frequency bands, the development of wireless communication systems (hereinafter referred to as "dual mode device") supporting the functionality of both WCDMA and LTE modes has been advancing. The dual mode device with an RF antenna can simultaneously communicate using both WCDMA and LTE signals that are on adjacent carrier frequencies, for example, a WCDMA system may be used for voice communications while an LTE system may be used for communicating high volumes of non-voice data.

Figure 1:
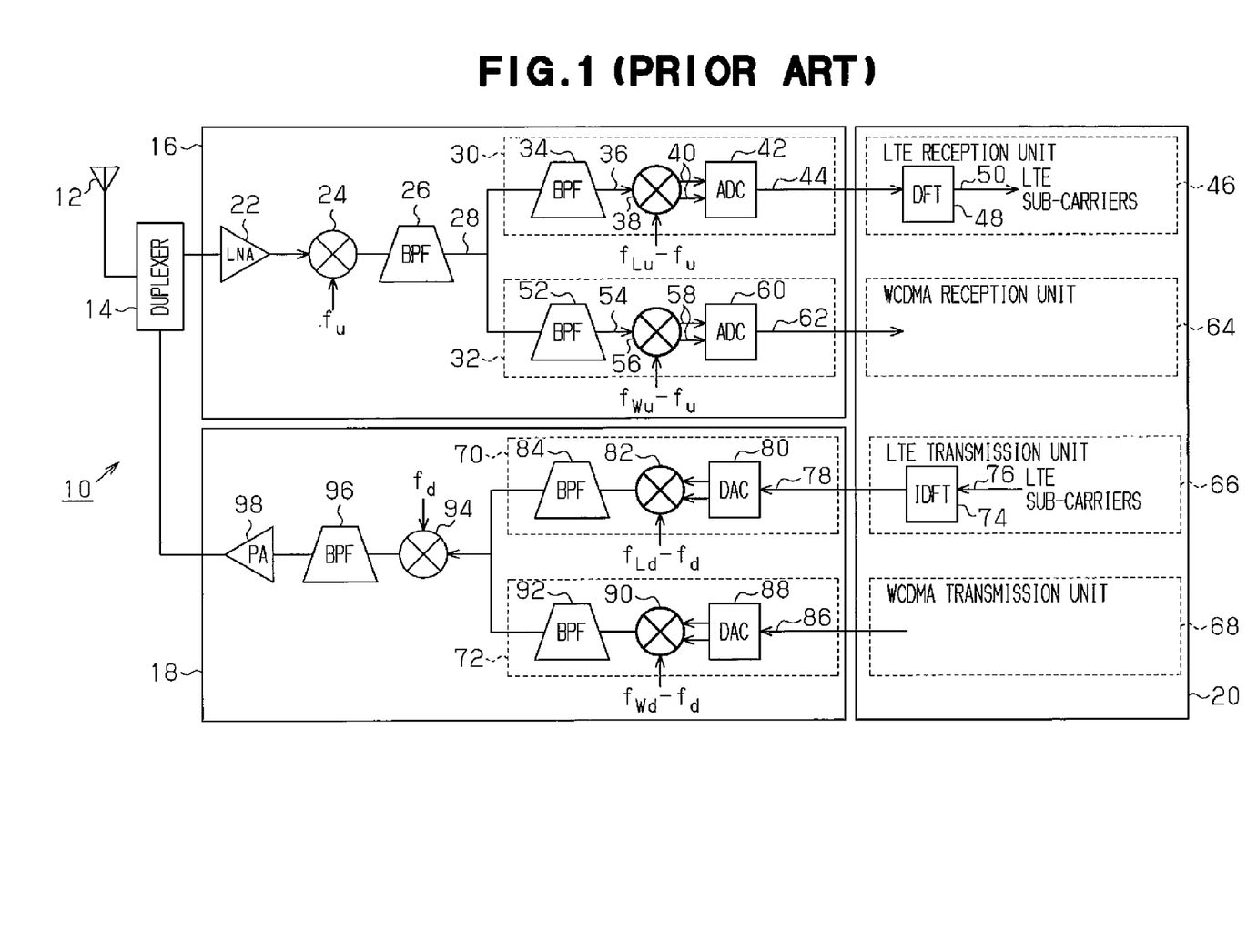
FIG. 1 is a schematic circuit diagram of a first prior art wireless communications device.

FIG. 1 schematically illustrates a prior art wireless communication device 10 (dual mode device) that may operate using WCDMA and LTE. As shown in FIG. 1, the wireless communication device 10 includes an antenna 12, a duplexer 14, an RF receiving portion 16, an RF transmission portion 18, and a baseband circuit 20. The RF receiving portion 16 includes a two system receiving RF interface that includes a first receiver RF interface 30 (hereinafter referred to as "first RRF-IF") for LTE use and a second receiver RF interface 32 (hereinafter referred to as "second RRF-IF") for WCDMA use, so that both LTE and WCDMA signals may be separately processed.

In regards to the first RRF-IF 30, a BPF 34 extracts an LTE signal 36 from a band limited signal 28. A quadrature modulator (QDEM) 38 that functions as center frequency (IF) circuit uses a differential frequency $(f_{Lu} - f_u)$ of the LO frequency $f_U$ and the carrier center frequency $f_{LU}$ of LTE, to demodulate the LTE signal 36, and generate analog IQ data 40. An ADC 42 generates digital IQ data 44 by A/D converting analog IQ data 40 at a given sampling frequency based on the received channel bandwidth. The digital IQ data 40 is supplied to an LTE receiving portion 46 of the baseband circuit 20. The LTE receiving portion 46 includes a discrete Fourier transformer 48 (DFT) connected to the ADC 42. The DFT 48 converts the digital IQ data 44 from the ADC 42, namely the resulting baseband signal as the information symbol of the time domain, to a subcarrier signal 50 shown as an information symbol (frequency spectrum) of the frequency domain according to the DFT size corresponding to the received channel bandwidth.

The second RRF-IF 32 has a BPF 52 that extracts a WCDMA signal 54 from the band limited signal 28. A QDEM 58 functions at center frequency (IF), using the differential frequency $(f_{Wu} - f_U)$ of LO frequency $f_U$ and the carrier center frequency $f_{Wu}$ of WCDMA, to demodulate the WCDMA signal 54, and generate analog IQ data 58. An ADC 60 generates digital IQ data 62 by A/D converting the analog IQ data 58 at the given oversampling frequency based on the WCDMA chip rate (3.84 Mcps). The digital IQ data 62 is processed by a WCDMA receiving portion 64 of the baseband circuit 20.

The RF transmission portion 18 similarly includes a two system RF transmission interface for separately processing the LTE and WCDMA signals, namely, a first transmission RF interface 70 (hereinafter "first TRF-IF") and a second transmission RF interface (hereinafter "second TRF-IF") that are respectively connected to an LTE transmission portion 66 and WCDMA transmission portion 68 of the baseband circuit 20. The LTE transmission portion 66 includes a discrete inverse Fourier transformer 74 (IDFT). The IDFT 74 converts a subcarrier signal 76 of information symbols in the frequency domain to digital IQ data 78 shown as a time domain information symbol according to the IDFT size corresponding to the transmission channel bandwidth.

The first TRF-IF 70 has a DAC 80 that D/A converts the digital IQ data 78 from IDFT 74 to an analog signal and provides the analog signal quadrature demodulator (QM) 82 using the differential frequency $(f_{Ld} - f_d)$ of LO frequency $f_d$ and the carrier center frequency $f_{Ld}$ of LTE to generate an LTE signal. Afterward, the frequency band of the LTE signal is limited to the given transmission channel bandwidth by BPF 84.

The second TRF-IF 72 has a DAC 88 that D/A converts digital IQ data 86 from the WCDMA transmission portion 68 and a QM 90 uses the differential frequency $(f_{Wd} - fd)$ to generate the WCDMA signal. The WCDMA signal band limited by BPF 92. An up converter 94 uses the LO frequency $f_d$ and converts each of the WCDMA and LTE signals from the first and second TRF-IF 70 and 72 to the transmission frequency. The unnecessary frequency components are removed by BPF 96 and the transmission power is amplified by power amplifier (PA) 98 so that the RF transmission portion 18 transmits the LTE and WCDMA signals.

The structure shown in FIG. 1 shows a double conversion method that uses the differential frequency to generate IQ data 40 and 58 (zero IF signal) after primarily converting the received frequency to the IF signal corresponding to the LO frequency $f_u$. However the down converter 24 may be omitted if only a single conversion is required, and the LO frequency $f_u$ is set to zero. Similarly, the RF transmission portion 18 may omit the up converter 94.

Figure 2:
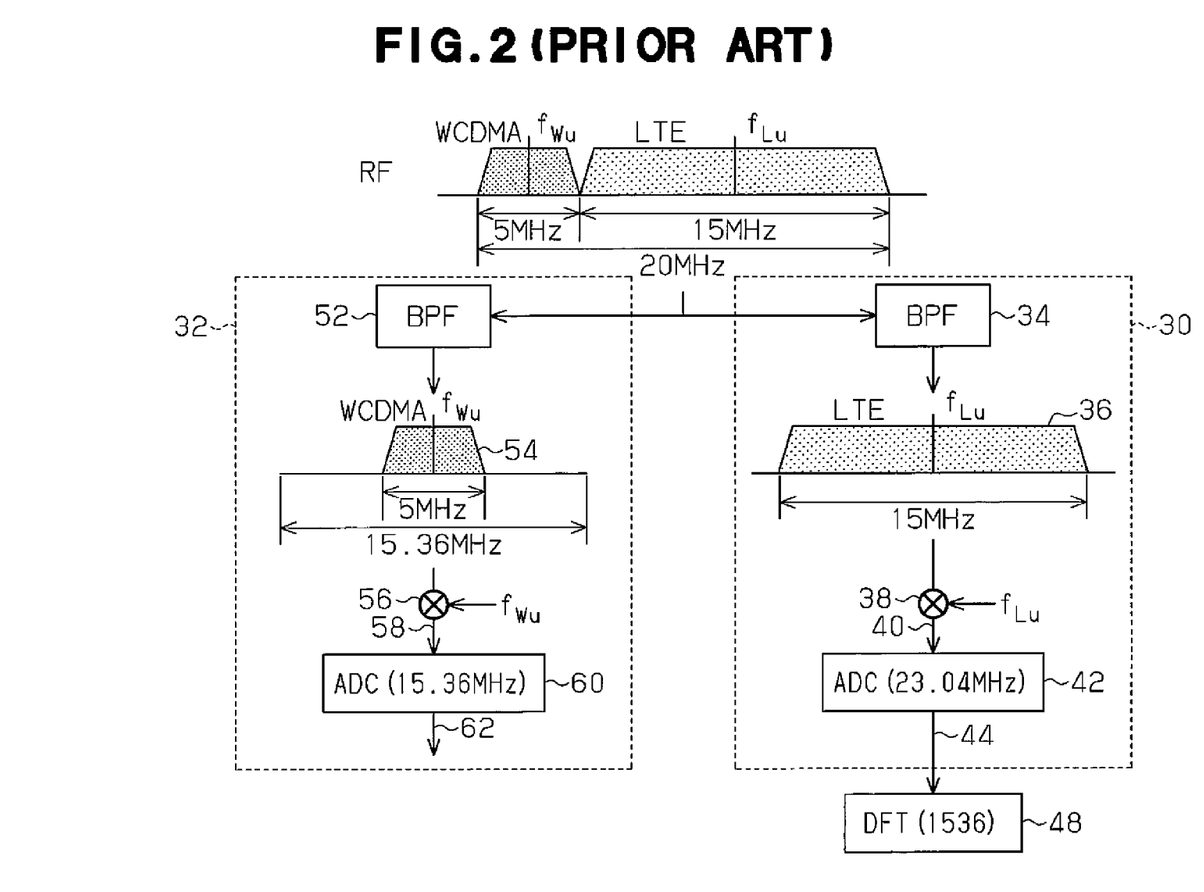
FIG. 2 is a schematic diagram illustrating the process flow of two paths of the RF interface of the wireless communications device of FIG. 1.

Referring to FIG. 2, the processes of the first RRF-IF 30 and second RRF-IF 32 of the RF receiving portion 16 will be explained in detail. For ease of comprehension, FIG. 2 shows the case where the RF receiving portion 16 performs single conversion (i.e., $f_u = 0$).

For example, when wireless communication device 10 continuously receives 5 MHz bandwidth WCDMA signals and 15 MHz bandwidth LTE signals, BPF 34 of the first RRF-IF 30 and BPF 52 of the second RRF-IF 32 operate independently to extract LTE signal 36 and WCDMA signal 54, respectively. In the LTE path, the LTE signal 36 is demodulated by QDEM 38 then A/D converted by ADC 42. The sampling frequency of the ADC 42 is fixed at the integrated value of the DFT size (1536 corresponding to 15 MHZ in FIG. 2) corresponding to the received channel bandwidth and subcarrier interval (fixed value of 15 kHz). Digital IQ data 44 is generated by the ADC 42 and supplied to the DFT 48. At the same time, the LTE receiving process is operating in parallel. WCDMA signal 54 is demodulated by QDEM 56 then A/D converted by ADC 60 in the WCDMA path. For WCDMA, the ADC 60 uses an oversampling frequency that is several times (4×, 8×) the chip rate (3.84 Mcps) to improve sensitivity. FIG. 2 shows an oversampling frequency of 4 times the chip rate set at 15.36 MHz. As such, digital IQ data 62 is generated by ADC 60 and supplied to the baseband circuit 20.

Thus, the communication device 10 includes both RRF-IF 30 and 32 at RF receiving portion 16, with respective ADCs 42 and 60, QDEMs 38 and 56, and BPFs 34 and 52. Similarly, the transmitter portion 18 includes both TRF-IFRF 70 and 72, and respective DACs 80 and 88, QMs 82 and 90, and BPFs 92 and 96. For this reason, a circuit-scale sized RF interface is relatively large and consumes a lot of power.

Figure 3:
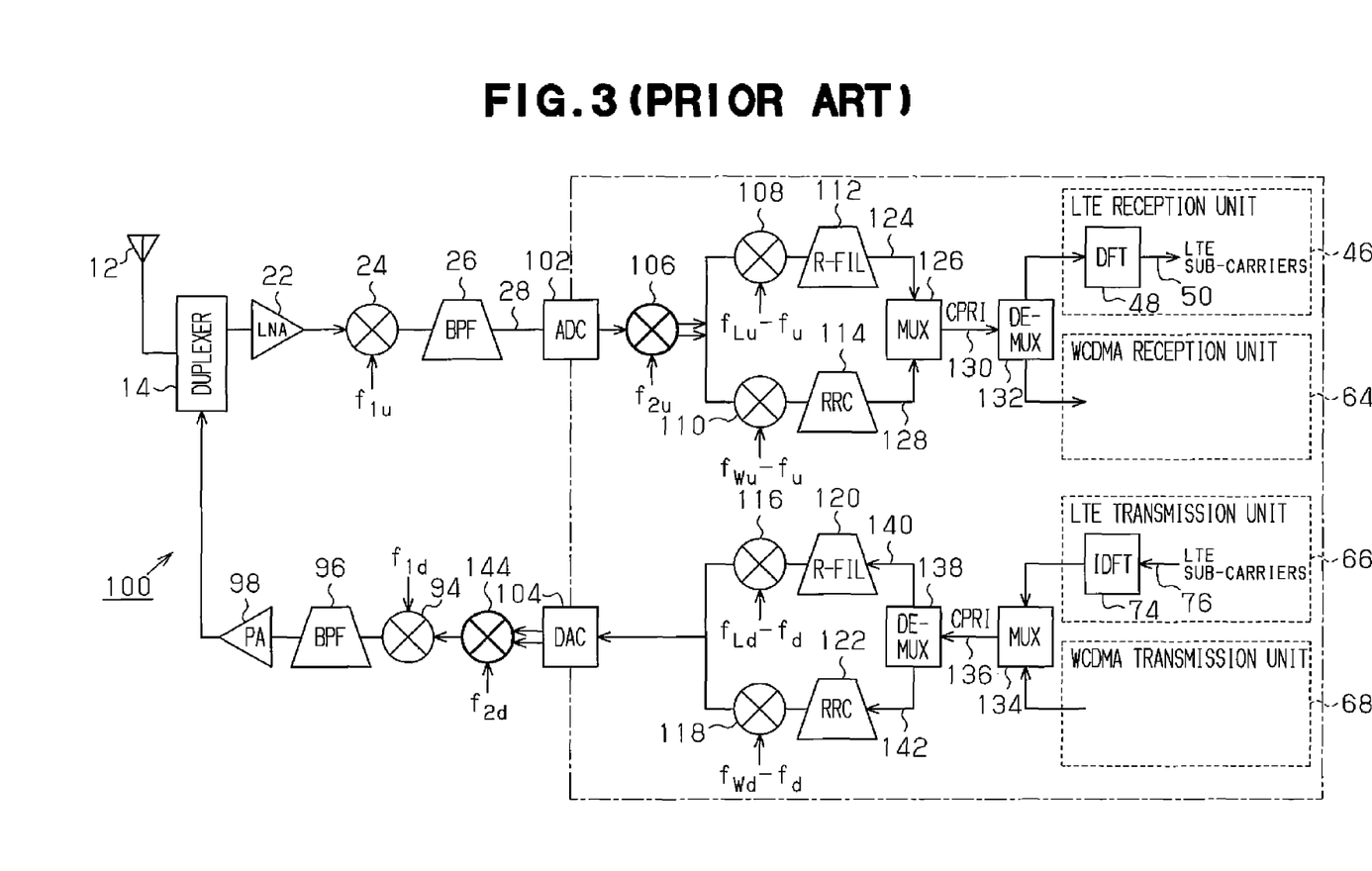
FIG. 3 is a schematic circuit diagram of a second prior art wireless communications device.

FIG. 3 shows another prior art wireless communication device 100. The wireless communication device 100 includes transmitter and receiver portions of the RF interface for a WCDMA/LTE wireless device. As compared to the wireless device 10 of FIG. 1, the wireless device 100 has an ADC 102 and a DAC 104 for the WCDMA and LTE links. Also, a Quadrature Modulator (QM) 106, down converters 108, 110, and filters 112, 114 in the RF receiver path perform the digital processing with up converters 116, 118 and filters 120, 122 in the RF transmission path. The dotted line portion in FIG. 3 shows the digital circuit portion.

When receiving, the down converter 24 converts an RF signal to an IF signal at the first LO frequency $f_{1u}$. QM106 has as an input the second LO frequency $f_{2u}$ ($<f_{1u}$) and generates digital IQ data from the output of ADC 102. In the LTE path, down converter 108 generates baseband signal 124 as a zero IF signal based on the differential frequency ($f_{Lu}-f_u$; where $f_u=f_{1u}+f_{2u}$) of the carrier center frequency, $f_{Lu}$, and LO frequencies, $f_{1u}$ and $f_{2u}$. The baseband signal 124 is supplied to multiplexer 126 via filter 112. Meanwhile in the WCDMA path, down converter 110 generates baseband signal 128 as the zero IF signal based on the differential frequency ($f_{Lu}-f_u$) of the carrier center frequency, $f_{Wu}$, and WCDMA LO frequencies, $f_{1u}$ and $f_{2u}$. The baseband signal 128 is supplied to multiplexer 126 via filter 114, which is a RRC (Root-raised Cosine) filter.

The multiplexer 124 time division multiplexes the WCDMA baseband signal 128 and the LTE baseband signal 124 and generates CPRI signal 130. The CPRI signal 130 is provided to demultiplexer 132, which separates the received CPRI signal 130 into WCDMA and LTE baseband signals and supplies the LTE baseband to LTE reception unit 46 (DFT 48), and supplies the WCDMA baseband to WCDMA reception unit 64. The transmission processing is basically the same as the receiving process explained above except in reverse. More specifically, CPRI signal 136 is time division transmitted from multiplexer 134, and separated into LTE baseband signal 140 and WCDMA baseband signal 142 at demultiplexer 138. In the LTE path, the LTE baseband signal 140 is digitally processed at rectangular filter 120 and up converter 116, while in the WCDMA path, the WCDMA signal 142 is digitally processed at RRC filter 122 and up converter 118. The outputs of the LTE and WCDMA paths are provided to DAC 104 and the output of the DAC 104 is provided to Quadrature Modulator (QM) 144, which modulates the analog signal output by the DAC 104. Up converter 94 modulates the individual frequencies of the LTE and WCDMA signals to the transmission frequency and then LTE and WCDMA signals are filtered by BPF 96, boosted by PA 98, and then transmitted with the antenna 12.

In FIG. 3, $f_d$ has the following relationship $f_d=f_{1d}+f_{2d}$, where $f_{1d}>f_{2d}$. Thus, FIG. 3 shows that in the wireless communication device 100, the ADC102 and DAC104 are shared by WCDMA and LTE signals. However as with the wireless communication device 10, the digital IQ data is processed in parallel in two independent paths. In the transmission and receiving paths in the structure of FIG. 3, WCDMA and LTE paths use the rectangular filter 120 and RRC filter 122, respectively. The Quadrature Demodulator 106 is shared by WCDMA and LTE, and then is connected to down converter 108 for LTE processing and down converter 110 for WCDMA processing. Similarly, the Quadrature Modulator 144 is shared by WCDMA and LTE, but then is connected to up converter 116 in the LTE path and up converter 118 in the WCDMA path. As a result, as the filter and frequency modulator use two independent RF interfaces, a relatively large amount of power is still consumed. Having two separate paths also increases circuit area. Thus, there is a need for a device that consumes less power and requires less circuit space.

BRIEF DESCRIPTION OF THE DRAWINGS

The present invention is illustrated by way of example and is not limited by the accompanying figures, in which like references indicate similar elements. Elements in the drawings are illustrated for simplicity and clarity and have not necessarily been drawn to scale.

DETAILED DESCRIPTION OF EMBODIMENTS

The present invention relates to a wireless communications device that has a common RF interface for separating and combining WCDMA (Wideband Code Division Multiple Access) signals and LTE (Long Term Evolution) signals, and a method for processing WCDMA and LTE signals. Although the wireless communication device described below may be described as a base terminal, it may also be implemented as a mobile device, for example, a communication terminal such as a handset. Thus, the present invention is not to be limited to one or the other.

Unless stated otherwise, terms such as "first" and "second" are used to arbitrarily distinguish between the elements such terms describe. Thus, these terms are not necessarily intended to indicate temporal or other prioritization of such elements. The word "coupled" refers to elements in electrical communication with each other, whether directly connected such as with a wire, indirectly connected, or connected wirelessly.

A first embodiment of the present invention is a wireless communications device that uses adjacent frequency bands to transmit and receive LTE and WCDMA signals. The wireless communications device includes a RF receiver interface that generates a received baseband signal that includes LTE and WCDMA signals, and a baseband circuit connected to the RF receiver interface. The baseband circuit includes a time-frequency conversion circuit that converts the received baseband signal from a time domain signal to a frequency domain signal, a separator that separates the WCDMA and LTE signals from the frequency domain signal, an RRC (root raised cosine) filter that filters the frequency domain WCDMA signal, and a frequency-time conversion circuit that converts the filtered WCDMA signal to a time domain WCDMA signal.

A second embodiment of the present invention is a wireless communications device that uses adjacent frequency bands to provide LTE and WCDMA signals. The device includes a RF transmission interface that transmits an RF baseband signal that includes LTE and WCDMA transmission signals and a baseband circuit including a transmission baseband circuit connected to the RF transmission interface. The transmission baseband circuit includes a time-frequency conversion circuit that converts a time domain WCDMA signal to a frequency domain WCDMA signal, a root raised cosine (RRC) filter that filters the frequency domain WCDMA signal and generates a filtered WCDMA signal, a synthesis circuit that combines a frequency domain LTE signal and the filtered WCDMA signal to generate a frequency domain signal, and a frequency-time conversion circuit that converts the frequency domain signal to a baseband transmission signal.

A third embodiment of the present invention is a baseband circuit for a wireless communications device that uses adjacent frequency bands to transmit and receive LTE and WCDMA signals. The baseband circuit includes a time-frequency conversion circuit that converts a received baseband signal including LTE and WCDMA signals to a frequency domain signal, a separator that separates the WCDMA and LTE signals from the frequency domain signal, a RRC filter to filter the WCDMA signal, and a frequency-time conversion circuit that converts the filtered WCDMA signal to a time domain WCDMA signal.

A fourth embodiment of the present invention is a baseband circuit for a wireless communications device that uses adjacent frequency bands to transmit LTE and WCDMA signals, including a time-frequency domain converter that converts a time domain WCDMA signal to a frequency domain WCDMA signal, an RRC filter that root raised cosine filters the frequency domain WCDMA signal and generates a filtered WCDMA signal, a synthesis circuit that combines the frequency domain LTE signal and the filtered WCDMA signal to generate a frequency domain signal, and a frequency-time conversion circuit that converts the frequency domain signal to a baseband transmission signal including LTE and WCDMA transmission signals.

Figure 4:
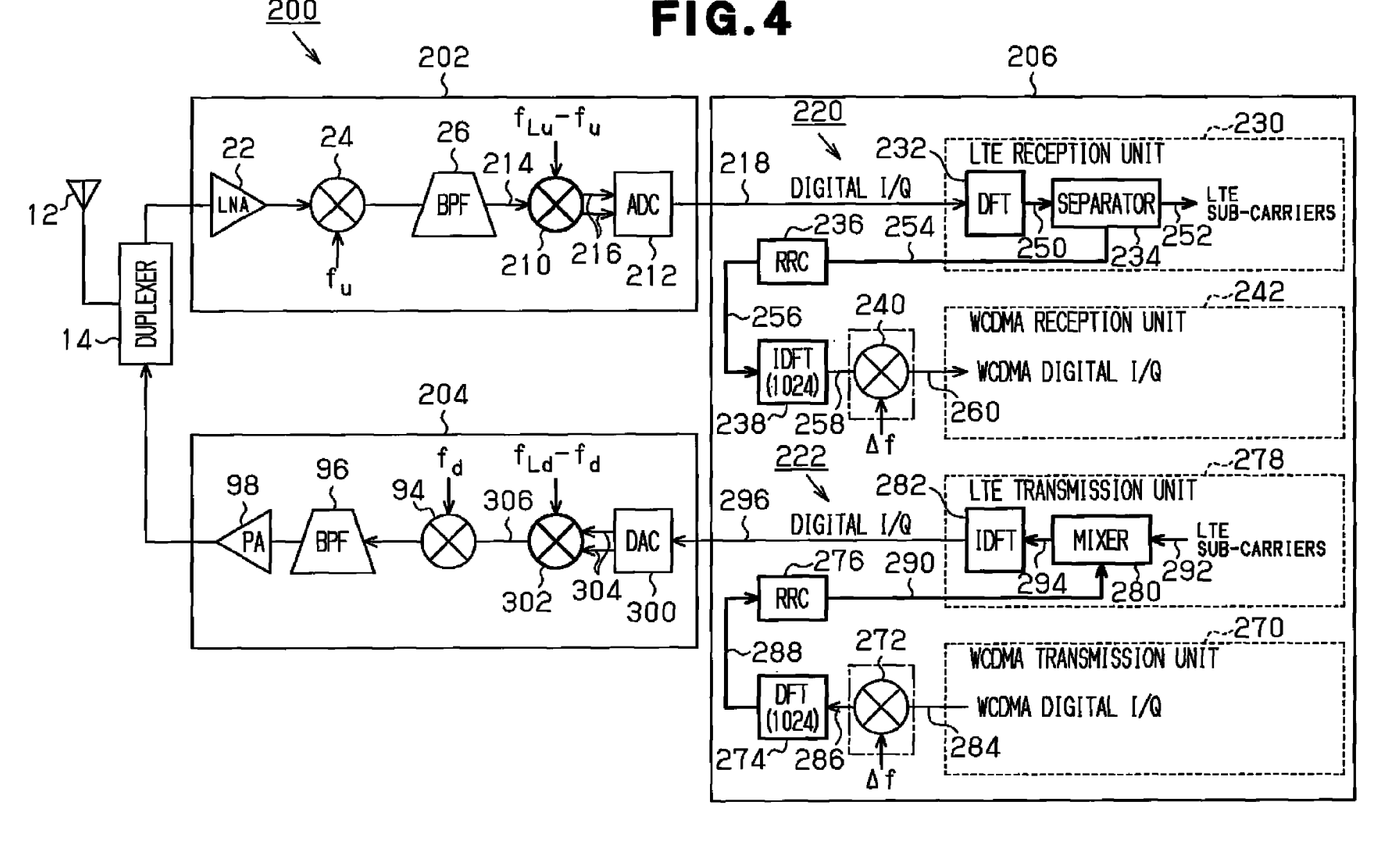
FIG. 4 is a schematic circuit diagram of a wireless communications device according to one embodiment of the present invention.

Referring now to FIGS. 4-7, one embodiment of a wireless communications device 200 will be described. While specific elements of the present invention may be known, the manner in which these elements are connected to each other and the manner in which signals are processed is novel. Thus, implementation details for individual circuit elements are not described in any more detail than necessary for one of skill in the art to understand the present invention. Referring now to FIG. 4, the wireless communications device 200 includes an antenna 12, duplexer 14, a RF receiver interface 202, a RF transmitter interface 204, and a baseband circuit 206. The baseband circuit 206 is configured as a dual mode circuit that processes both WCDMA and LTE signals. The wireless communications device 200 is explained below as a base station. However the same applies if it was a mobile terminal (any type of handset or other communications terminal).

The RF receiver interface 202 includes a LNA 22, down converter 24, BPF 26, quadrature demodulator (QDEM) 210, and ADC 212. A RF signal is received by the antenna 12 and is provided to the duplexer 14. In this embodiment, the RF receiver interface 202 continuously receives the RF signal from the duplexer and as previously discussed, the RF signal includes both LTE and WCDMA signals on adjacent carrier frequencies. The LNA 22 amplifies the received RF signal; down converter 24 converts the amplified, received RF signal to an IF signal using a local oscillation frequency $f_u$ (LO) that is less than the receiving frequency. The BPF 26 limits the frequency domain of the IF signal and generates a received baseband signal that includes a WCDMA signal (in other words, the channel bandwidth for WCDMA) and LTE signal (in other words, the channel bandwidth for LTE). The QDEM 210 uses a differential frequency $(f_{Lu}-f_u)$ of the LO frequency $f_u$ and LTE carrier center frequency $f_{Lu}$ to demodulate the received baseband signal 214 and generates analog IQ data 216, which is converted to digital IQ data by an ADC 212. That is, the ADC 212 converts both the WCDMA and LTE signals from analog data to digital data at a variable sampling frequency corresponding to the channel bandwidths of the LTE and WCDMA channel bandwidths, and generates digital IQ data 218.

The digital IQ data 218 is supplied to the baseband circuit 206. The baseband circuit 206 includes a receiver baseband circuit 220 and a transmission baseband circuit 222. The receiver baseband circuit 220 includes an LTE receiver circuit 230 that includes a separator 234 and a first time-frequency conversion circuit, which is implemented as a discrete Fourier transform (DFT) 232, an RRC filter 236, a first frequency-time conversion circuit that implements an inverse discrete Fourier transform (IDFT) 238, a frequency adjustment circuit 240, and a WCDMA reception unit 242.

The LTE receiver circuit 230 comprises the DFT 232, which is connected to the ADC 212. The DFT 232 converts the digital IQ data 218 (synthesized baseband signal generated as a time domain information symbol data) output from the ADC 212 from a time domain signal to a frequency domain signal 250 where the DFT size corresponds to the synthesized channel bandwidth. The frequency domain signal 250 includes the LTE signal (subcarrier signal) 252 and WCDMA signal 254 positioned adjacent to each other in the given frequency domain.

The separator 234 extracts the sample group necessary for further LTE baseband processing and generates the frequency domain LTE signal (subcarrier) 252 from the frequency domain signal 250. The separator 234 also separates the WCDMA signal 254 from the frequency domain signal. This frequency domain WCDMA signal 254 is supplied to the RRC filter 236. The RRC filter 236 performs RRC filtering on the frequency domain WCDMA signal 254 and generates a filtered WCDMA signal 256. Note, that in the prior art device described with reference to FIG. 3, the RRC filter 114 filters a time-domain WCDMA signal, while in the present invention, the RRC filter is located such that it filters a frequency domain WCDMA signal. This allows for a less complex filter circuit because the filtering is only of the multiplication of the given weighted value of each sample of the WCDMA signal.

The first frequency-time conversion circuit or IDFT 238 performs an inverse discrete Fourier transform on the filtered WCDMA signal 256 using a given IDFT size based on the WCDMA channel bandwidth and generates a time domain WCDMA signal 258. In this embodiment, the IDFT size of IDFT 238 is a fixed value, for example, set at 1024.

The frequency adjustment circuit 240 performs frequency compensation on the time domain WCDMA signal 258 (digital IQ data) based on the variable modulation value Δf so that the difference between the LTE and WCDMA carrier center frequencies is an integral multiplier of 15 kHz. The frequency adjustment circuit 240 outputs a WCDMA signal 260 (digital IQ data) on which known baseband processing may be performed by the WCDMA reception unit 242.

The configuration of the transmission baseband circuit 222 will now be explained. The transmission baseband circuit 222 includes a WCDMA transmission circuit 270, frequency adjustment circuit 272, second time-frequency conversion circuit or DFT 274, second RRC filter 276 (filters frequency domain signal), and LTE transmission unit 278. The LTE transmission unit 278 further comprises a synthesis circuit or mixer 280 and a second frequency-time conversion circuit or IDFT 282. The processing performed by the transmission baseband circuit 222 is basically the same as that of the receiver baseband circuit 220 except in reverse.

The frequency adjustment circuit 272 compensates the WCDMA digital IQ data 284 supplied by the WCDMA transmission unit 270 based on the variable modulation value Δf. The DFT 274 performs a discrete Fourier transform on the time domain WCDMA signal 286 (digital IQ data) output by the frequency modulation unit 272, using a given DFT size based on the WCDMA channel bandwidth and generates a frequency domain WCDMA signal 288. In this embodiment, the DFT size of the DFT 274 is a fixed value, for example, set at 1024. Similar to the RRC filter 236, the RRC filter 276 filters the frequency domain WCDMA signal 288 using a raised root cosine filter to generate a filtered WCDMA signal 290. Thus, as compared to the prior art (RRC filter 112 of FIG. 3), the structure of the RRC filter is simplified.

The filtered WCDMA signal is provided to the LTE transmission unit 278, and more specifically, to a mixer 280, which combines a LTE signal (subcarrier signal) 292 with the filtered WCDMA signal 290 and generates a frequency domain signal 294. The second frequency-time conversion circuit or IDFT 282 converts the frequency domain signal 294 to digital IQ data 296 (the synthesis baseband transmission signal including the WCDMA and LTE signals) according to the IDFT size corresponding to the synthesized channel bandwidth including the LTE and WCDMA channel bandwidths. The digital IQ data 296 is provided to the RF transmitter interface 204.

The RF transmitter interface 204 includes a DAC 300, quadrature modulator (QM) 302, up converter 94, band pass filter (BPF) 96, and power amplifier (PA) 98. The DAC 300, which is in a common path for WCDMA and LTE processing, converts the digital IQ data to analog IQ data 304 at a variable sampling frequency corresponding to the synthesized channel bandwidth during transmission. The QM 302 uses the differential frequency $(f_{Ld}-f_d)$ of the LO frequency $f_d$ and $f_{Ld}$ of the LTE carrier center frequency and modulates the analog IQ data 304 to generate a baseband transmission or carrier signal 306.

The up converter 94 converts carrier signal 306 to the appropriate transmission frequency using the LO frequency $f_d$. The unnecessary frequency components are removed from the up converted signal by the BPF 96, and the PA 98 amplifies the resulting RF signal for transmission via the antenna 12. Note the receiver RF interface 202 has a double conversion method that transforms the receiving frequency to the IF signal corresponding to the LO frequency $f_u$, then generates the IQ data 216 (zero IF signal) using the differential frequency. However, for single conversion, the down converter 24 is omitted and LO frequency $f_u$ is set to 0. Similarly, for the RF transmitter interface 204, the up converter 94 could be omitted.

Figure 5:
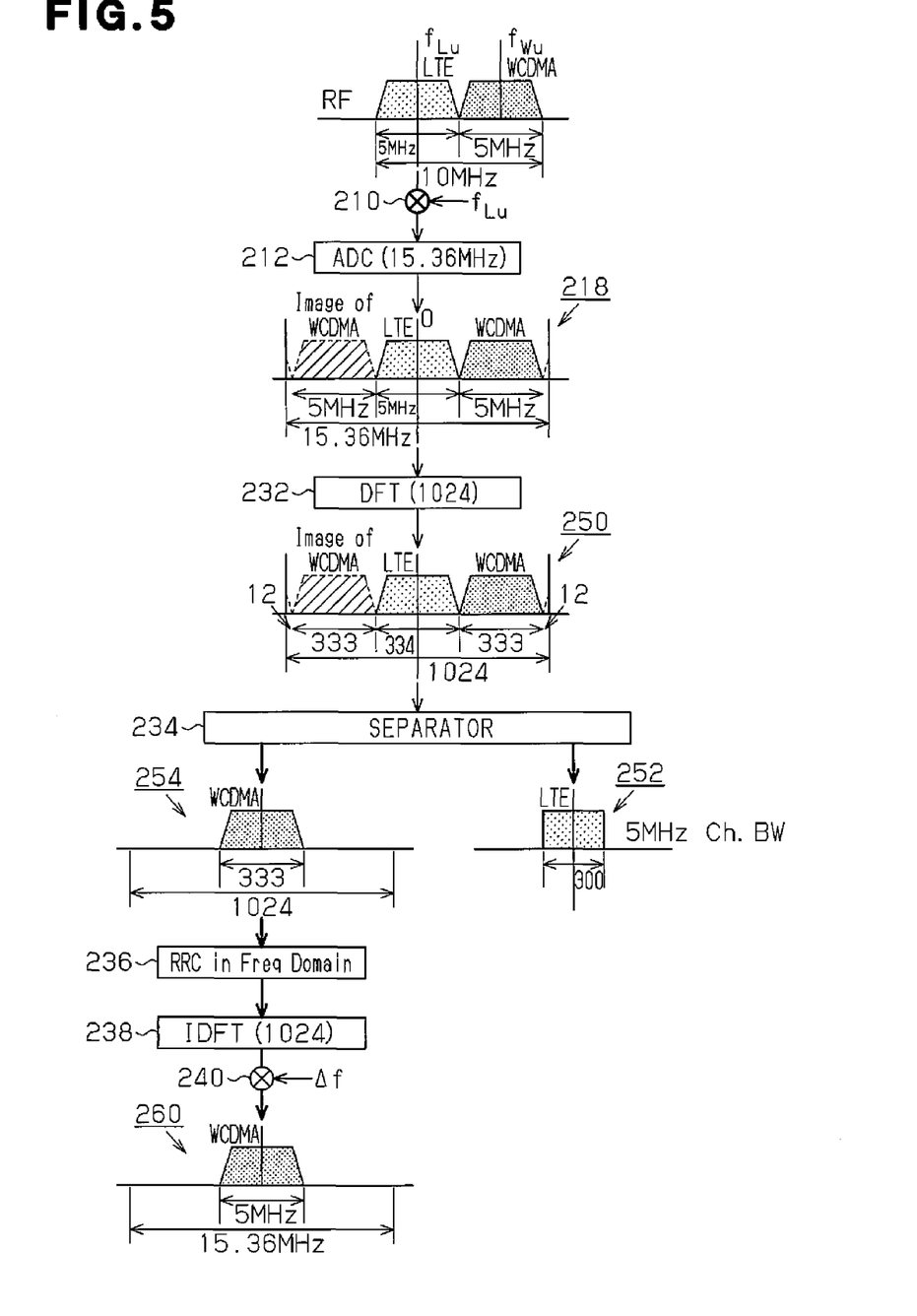
FIG. 5 is a schematic diagram illustrating the process flow of the baseband circuit of the wireless communications device of FIG. 4 when the WCDMA receiver bandwidth is 5 MHz and the LTE receiver bandwidth is 5 MHz.
Figure 6:
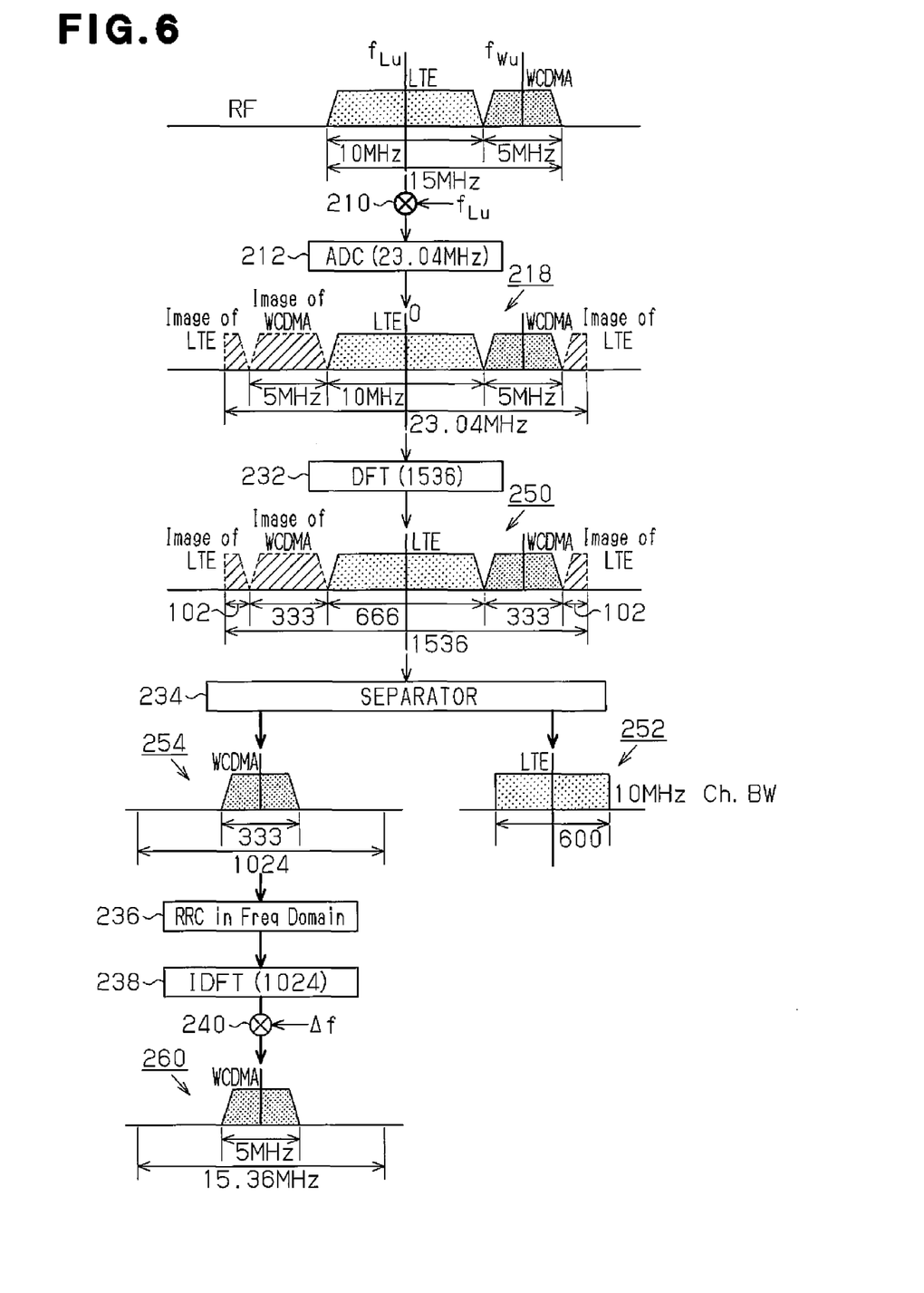
FIG. 6 is a schematic diagram illustrating the process flow of the baseband circuit of the wireless communications device of FIG. 4 when the WCDMA receiver bandwidth is 5 MHz and the LTE receiver bandwidth is 10 MHz.
Figure 7:
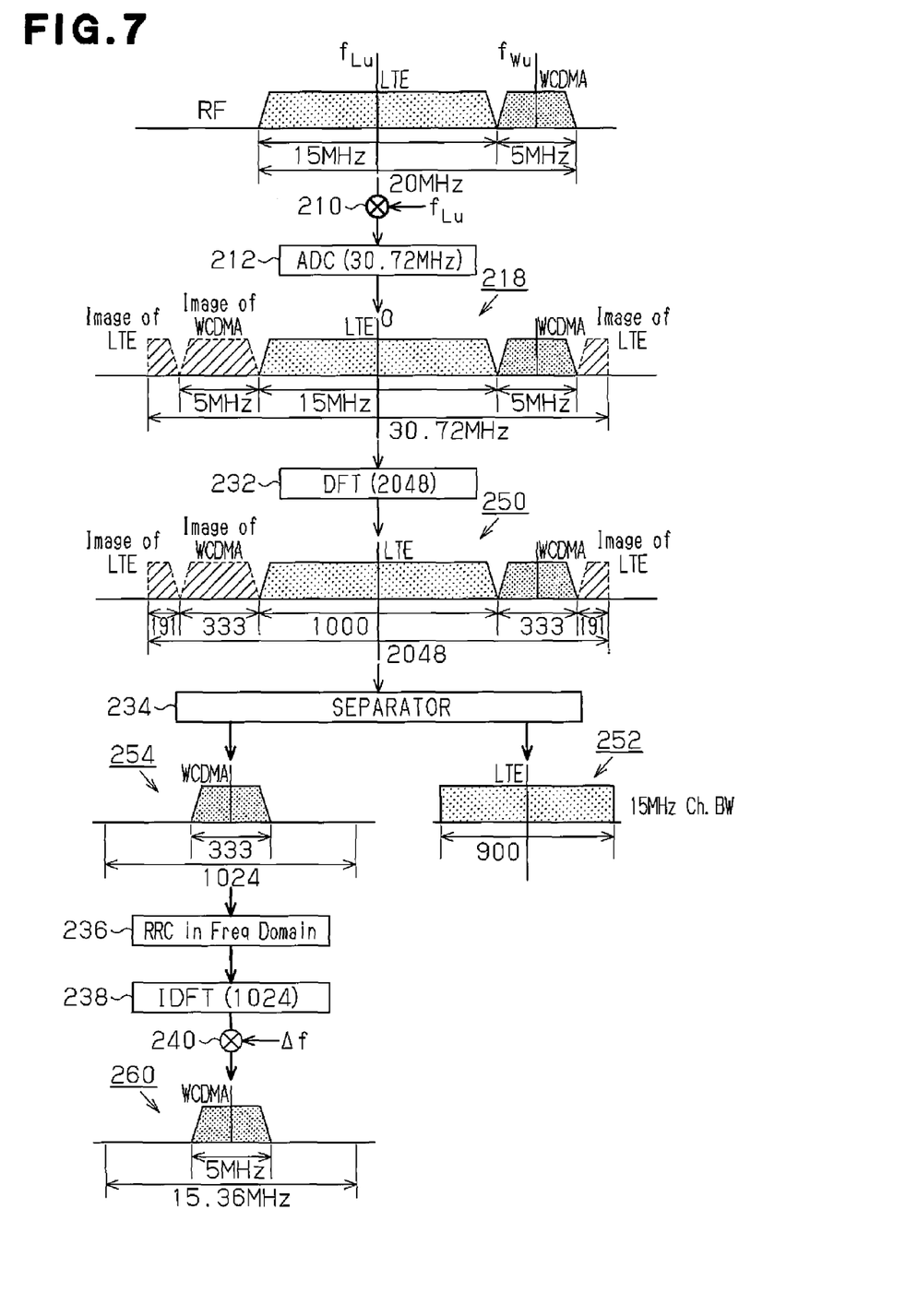
FIG. 7 is a schematic diagram illustrating the process flow of the baseband circuit of the wireless communications device of FIG. 4 when the WCDMA receiver bandwidth is 5 MHz and the LTE receiver bandwidth is 15 MHz.

Referring to FIGS. 5-7, the process of the receiver baseband circuit 220 of the baseband circuit 206 will now be explained. For simple understanding, FIGS. 5-7 illustrate a case where the RF receiver interface 202 uses a single conversion (in other words, $f_u=0$).

FIG. 5 illustrates when the wireless communication device 200 continuously receives WCDMA and LTE signals, both of 5 MHz bandwidth. In this case, the QDEM 210 receives the received baseband signal (carrier signal) 214 having a synthesized channel bandwidth of 10 MHz; the received baseband signal 214 is demodulated by the QDEM 210 and analog IQ data 216 is generated.

The ADC 212 converts the analog IQ data 216 at the sampling frequency of 15.36 MHz based on the synthesized channel bandwidth of 10 MHz. Specifically, the ADC 212 converts the analog IQ data 216 using the sampling frequency determined from the multiplication product of the subcarrier interval (fixed value of 15 kHz) of the LTE signal and the DFT size (1024) corresponds to the synthesized channel bandwidth 10 MHz of the received baseband signal 214. Thus, in the case of FIG. 5, the sampling frequency of the ADC 212 is set to 15.36 MHz. In other words, when the synthesized channel bandwidth is 10 MHz, the sampling rate of the analog IQ data 216 is set to an oversampling frequency that is four times the WCDMA chip rate (3.84 Mcps). As a result, the digital IQ data 218 (zero IF signal) of the time domain corresponds to 15.36 MHz. At this time, the data output from the ADC 212 is added to the actual LTE and WCDMA signals, and the WCDMA signal (WCDMA signal image having a 5 MHz bandwidth) is included.

The DFT 232 converts the digital IQ data 218 to the frequency domain signal 250 using a DFT size (1024). The separator 234 separates the WCDMA signal 254 and LTE signal (subcarrier signal) 252 from the frequency domain signal 250.

Next, the RRC filter 236 filters the frequency domain WCDMA signal 254 and then the IDFT 238 converts the filtered WCDMA signal 256 to the time domain WCDMA signal 258 using a fixed IDFT size (1024 in this embodiment). The sampling rate of the WCDMA signal 258 corresponds to an oversampling frequency (15.36 MHz), which is four times the WCDMA chip rate (3.84 Mcps). Thus, good receiving sensitivity of the WCDMA signal is assured. Afterward, if necessary, the center frequency of the time domain WCDMA signal 258 is adjusted by the frequency adjustment circuit 240, which outputs the WCDMA signal 260.

FIG. 6 shows the wireless communication device 200 continuously receiving 5 MHz bandwidth WCDMA signals and 10 MHz LTE signals. In this case, the QDEM 210 receives the carrier signal 214 having a synthesized channel bandwidth of 15 MHz.

In the example of FIG. 6, the ADC 212 performs A/D conversion using the sampling frequency based on the multiplication product of the subcarrier interval (15 kHz) of the LTE signal and a DFT size (1536) corresponding to the synthesized channel bandwidth of 15 MHz. The sampling frequency at ADC 12 is set to 23.04 MHz and the DFT 232 converts digital IQ data 218 to the frequency domain signal 250 using the above DFT size (1536). The separator 234 extracts the WCDMA signal 254 and LTE signal (subcarrier signal) 252 from the frequency domain signal 250. The WCDMA signal 254 is filtered by the RRC filter 236, and of note, the WCDMA signal being filtered is a frequency domain signal. The filtered WCDMA signal 256 is converted to the time domain WCDMA signal 258 (digital IQ data) using a fixed IDFT size (1024 in this embodiment) by the IDFT 238. Thus, even in FIG. 6, the sampling rate of the WCDMA signal 258 corresponds to an oversampling frequency (15.36 MHz) that is four times the WCDMA chip rate (3.84 Mcps).

FIG. 7 shows the wireless communication device 200 continuously receiving a 5 MHz bandwidth WCDMA signal and a 15 MHz bandwidth LTE signal. In this case, the QDEM 210 receives the carrier signal 214 having a synthesized channel bandwidth of 20 MHz.

In this example, the ADC 212 performs A/D conversion using the sampling frequency of the multiplication product of the subcarrier interval (15 kHz) for LTE and the first time-frequency conversion circuit or DFT 232 has a DFT size (2048) corresponding to the synthesis channel bandwidth of 20 MHz. In the case shown in FIG. 7, the sampling frequency of the ADC 212 is set to 30.72 MHz and the DFT 232 converts the digital IQ data 218 to the frequency domain signal 250 using the above DFT size (2048) and the separator 234 extracts the WCDMA signal 254 and LTE signal (subcarrier signal) 252 from the frequency domain signal 250. Next, the WCDMA signal 254 is filtered by the RRC filter 236. The filtered WCDMA filtered signal 256 output by the RRC filter 236 is converted to the time domain WCDMA signal 258 (digital IQ data) by the first frequency-time conversion circuit or IDFT 238 using a fixed IDFT size (1024 in this embodiment). Thus, in FIG. 7, the WCDMA chip rate (3.84 Mcps) corresponds to the oversampling frequency (15.36 MHz) that is four times the WCDMA chip rate (3.84 Mcps).

It should be apparent to those skilled in the art that the present invention may be embodied in many other specific forms without departing from the spirit or scope of the invention. For example, the recommended size of the time frequency conversion portion should be two and discrete Fourier transformers 232 and 274 may be fast Fourier Transformer units (FFT); the recommended size of the frequency-time conversion circuit should be two and the discrete inverse Fourier transformers 238 and 282 may be discrete inverse fast Fourier transformers (IFFT). The IDFT size provided for IDFT 238 may be a variable value instead of a fixed value; the DFT size provided for DFT 274 may be a variable value instead of a fixed value; the RF receiver interface shown in FIG. 4 is not limited to interface 202; the RF transmission interface shown in FIG. 4 is not limited to interface 204; the circuit diagram of FIG. 4 is exemplary as the individual circuit elements may be functionally synthesized or divided for other implemented devices.

The invention claimed is:

1. A wireless communications device for transmitting and receiving Long Term Evolution (LTE) and Wideband Code Division Multiplexed (WCDMA) signals on adjacent frequency bands, the communications device comprising:
a Radio Frequency (RF) receiver interface that generates a received baseband signal including a WCDMA received signal and a LTE received signal from a received RF signal,
wherein the RF receiver interface includes an Analog to Digitgal Converter (ADC) that generates the received baseband signal having a sampling frequency corresponding to a combined channel bandwidth including a WCDMA channel bandwidth and a LTE channel bandwidth; and
a baseband circuit including a receiver baseband circuit connected to the RF receiver interface, wherein the receiver baseband circuit comprises:
a first time-frequency conversion circuit that converts the received baseband signal to a frequency domain signal based on a time frequency conversion size corresponding to the combined channel bandwidth to the frequency domain signal;
a separator that separates the frequency domain signal to a frequency domain WCDMA signal and a frequency domain LTE signal;
a Root Raised Cosine (RRC) filter coupled to the separator that root-raised cosine filters the frequency domain WCDMA signal and generates a filtered WCDMA signal; and
a first frequency-time conversion circuit that converts the filtered WCDMA signal to a time domain WCDMA signal.

2. The wireless communications device of claim 1, wherein the RF receiver interface includes a quadrature demodulator that processes the RF signal to generate the received baseband signal.

3. The wireless communications device of claim 1, wherein the RRC filter is connected in series between the first time-frequency conversion circuit and the frequency-time conversion circuit.

4. The wireless communications device of claim 1, wherein the frequency-time conversion circuit converts the filtered WCDMA signal to the time domain WCDMA signal using a frequency time conversion size based on the WCDMA channel bandwidth.

5. The wireless communications device of claim 4, wherein the frequency time conversion size is fixed.

6. The wireless communications device of claim 5, further comprising a frequency adjustment circuit that adjusts a center frequency of the time domain WCDMA signal.

7. The wireless communications device of claim 1, further comprising:
a RF transmission interface that generates an RF transmission signal from a baseband transmission signal, wherein the baseband transmission signal includes a LTE transmission signal and a WCDMA transmission signal;
wherein the baseband circuit further comprises a transmission baseband circuit connected to the RF transmission interface, the transmission baseband circuit comprising:
a second time-frequency conversion circuit that converts a time-domain WCDMA transmission signal to a frequency domain WCDMA transmission signal;
a second RRC filter that root-raised cosine filters the frequency domain WCDMA transmission signal and generates a filtered WCDMA transmission signal;
a synthesis circuit that combines the filtered WCDMA transmission signal with a frequency domain LTE transmission signal and generates a frequency domain transmission signal; and
a second frequency-time conversion circuit that converts the frequency domain transmission signal to the baseband transmission signal.

8. A wireless communications device for transmitting Long Term Evolution (LTE) and Wideband Code Division Multiplexed (WCDMA) signals on adjacent frequency bands, the communications device comprising:
a Radio Frequency (RF) transmission interface that generates an RF signal from a baseband transmission signal including a LTE transmission signal and a WCDMA transmission signal; and
a baseband circuit including a transmission baseband circuit connected to the RF transmission interface, wherein the transmission baseband circuit comprises:
a time-frequency conversion circuit that converts a time domain WCDMA signal to a frequency domain WCDMA signal;
a Root Raised Cosine (RRC) filter connected in series between the time-frequency conversion circuit and the frequency-time conversion circuit that root-raised cosine filters the frequency domain WCDMA signal and generates a filtered WCDMA signal;
a synthesis circuit that combines a frequency domain LTE signal with the filtered WCDMA signal and generates a frequency domain signal; and
a frequency-time conversion circuit that converts the frequency domain signal to the baseband transmission signal.

9. The wireless communication device of claim 8, wherein the RF transmission interface includes:
a digital to analog converter (DAC) that receives the baseband transmission signal and generates an analog baseband transmission signal; and
a quadrature demodulator connected to the DAC for demodulating the analog baseband transmission signal.

10. The wireless communication device of claim 9, wherein the DAC converts the baseband transmission signal at a sampling frequency corresponding to a WCDMA channel bandwidth and a LTE channel bandwidth.

11. The wireless communication device of claim 10, wherein the frequency-time conversion circuit performs an inverse discrete Fourier transform on the frequency domain signal to generate the baseband transmission signal.

12. The wireless communication device of claim 8, wherein the time-frequency conversion circuit converts the time domain WCDMA signal to the frequency domain WCDMA signal at a given time frequency conversion size based on the WCDMA channel bandwidth.

13. The wireless communication device of claim 12, wherein the time frequency conversion size is fixed.

14. The wireless communication device of claim 8, comprising:
a frequency adjustment circuit that adjusts a center frequency of the time domain WCDMA signal.

15. A baseband circuit for a wireless communications device that transmits and receives Long Term Evolution (LTE) and Wideband Code Division Multiplexed (WCDMA) signals on adjacent frequency bands, the baseband circuit comprising:
a first time-frequency conversion circuit that converts a received baseband signal including a LTE received signal and a WCDMA received signal to a frequency domain signal;
a separator that separates the frequency domain signal into a frequency domain WCDMA signal and a frequency domain LTE signal;
a first Root Raised Cosine (RRC) filter that root-raised cosine filters the frequency domain WCDMA signal and generates a filtered WCDMA signal;
a first frequency-time conversion circuit that converts the filtered WCDMA signal to a received time domain WCDMA signal; and
a frequency adjustment circuit that adjusts a center frequency of the received time domain WCDMA signal.

16. The baseband circuit of claim 15, further comprising:
a second time-frequency conversion circuit that converts a time domain WCDMA transmission signal to a frequency domain WCDMA transmission signal;
a second RRC filter that root-raised cosine filters the frequency domain WCDMA transmission signal and generates a filtered WCDMA transmission signal;
a synthesis circuit that combines a frequency domain LTE transmission signal with the filtered WCDMA transmission signal and generates a frequency domain transmission signal; and
a second frequency-time conversion circuit that converts the frequency domain transmission signal to a baseband transmission signal.

* * * * *